United States Patent
Bailey et al.

(10) Patent No.: US 12,197,900 B2
(45) Date of Patent: Jan. 14, 2025

(54) RULES PROCESSING SYSTEMS AND METHODS WITH JUST-IN-TIME COMPILATION FOR ENDPOINT PROTECTION IN KERNEL MODE

(71) Applicant: OPEN TEXT HOLDINGS, INC., San Mateo, CA (US)

(72) Inventors: Michael James Bailey, Pasadena, CA (US); Jacob Harris Therrien, Los Angeles, CA (US)

(73) Assignee: OPEN TEXT HOLDINGS, INC., Menlo Park, CA (US)

(*) Notice: Subject to any disclaimer, the term of this patent is extended or adjusted under 35 U.S.C. 154(b) by 287 days.

(21) Appl. No.: 17/740,804

(22) Filed: May 10, 2022

(65) Prior Publication Data
US 2023/0367564 A1 Nov. 16, 2023

(51) Int. Cl.
*G06F 8/41* (2018.01)

(52) U.S. Cl.
CPC .................................... *G06F 8/41* (2013.01)

(58) Field of Classification Search
CPC . G06F 8/41; G06F 8/441; G06F 8/443; G06F 8/4432; G06F 8/4441; H04L 63/14; H04L 63/1416; H04L 63/145; H04L 63/20
See application file for complete search history.

(56) References Cited

U.S. PATENT DOCUMENTS

| 11,245,730 | B2 | 2/2022 | Bailey | |
|---|---|---|---|---|
| 2008/0127303 | A1* | 5/2008 | Wrighton | G06F 21/53 717/106 |
| 2019/0050273 | A1* | 2/2019 | Tamir | G06F 9/5044 |
| 2022/0094703 | A1* | 3/2022 | Bailey | H04L 63/1416 |
| 2022/0179949 | A1* | 6/2022 | LeMay | G06F 21/54 |

OTHER PUBLICATIONS

E. Zadok et al., "Efficient and safe execution of user-level code in the kernel," 19th IEEE International Parallel and Distributed Processing Symposium, Denver, CO, USA, 2005, pp. 1-8. (Year: 2005).*

* cited by examiner

*Primary Examiner* — Hanh Thi-Minh Bui
(74) *Attorney, Agent, or Firm* — Sprinkle IP Law Group (57) ABSTRACT

An endpoint protection system implementing a new blocking strategy allows a user to specify an arbitrary number of protection rules through a user interface. In user mode, the protection rules are compiled into a single expression tree, which is then compiled into byte code. In kernel mode, the byte code is dynamically loaded in memory (e.g., kernel space) and the assembler validates the byte code and performs a plurality of security checks, then ultimately assembles the byte code into machine code that is native to the processor. Because complex detection/protection logic is compiled in user mode, the invention allows for highly expressive and powerful protection rules. Further, because complex detection/protection logic is not manually written in kernel mode, but validated then evaluated via simple machine code instructions in the privileged mode, the invention is safer and will not slow down the entire operating system.

17 Claims, 6 Drawing Sheets

RULES PROCESSING SYSTEMS AND METHODS WITH JUST-IN-TIME COMPILATION FOR ENDPOINT PROTECTION IN KERNEL MODE

TECHNICAL FIELD

This disclosure relates generally to endpoint protection and security. More particularly, this disclosure relates to rule processing systems, methods, and computer program products with just-in-time compilation for endpoint protection in kernel mode.

BACKGROUND OF THE RELATED ART

In computing, computers and computing devices alike run on system software referred to as operating systems. An operating system manages computer hardware and software resources and provides various services for computer programs referred to herein as applications. The operating system runs in a privileged processor mode known as kernel mode. The applications run in a non-privileged processor mode known as user mode.

In kernel mode, the operating system has access to system data and hardware resources. In user mode, the applications have limited access to system data and hardware resources through system calls. These system calls provide a programmatic way for the applications to request services of the operating system, for instance, process control (e.g., creation and management of processes), main memory management, file management (e.g., management of file access, directory, and file system), device management (e.g., device handling such as input/output), networking, and protection (e.g., endpoint protection).

An endpoint refers to a remote computing device that communicates with a computer network with which it is connected. Examples of endpoints can include desktop computers, laptop computers, smartphones, tablet computers, servers, workstations, and so on. These remote computing devices represent vulnerable points of entry into their respective computer networks as they are where attackers execute code and exploit network vulnerabilities and where digital assets are encrypted, exfiltrated, or otherwise leveraged.

Endpoint detection and response (EDR), also known as endpoint threat detection and response, refers to a cyber security technology that continuously monitors endpoints, through agents on the endpoints and/or sensors, and responds to mitigate threats from the Internet. For systems in the endpoint security space, a traditional way for endpoint monitoring is to hard code a list of sources (e.g., event data providers) for an agent running on an endpoint to listen and stream events containing behavioral data from those sources. Once the behavioral data sent by the agents and/or sensors is stored in a centralized database, an EDR system can run analytics on the behavioral data, identify patterns in the behavioral data, detect anomalies in the patterns, and send alerts for remedial action or further investigation. An example EDR system is described in U.S. Pat. No. 11,245,730, entitled "SYSTEMS AND METHODS OF INFORMATION SECURITY MONITORING WITH THIRD-PARTY INDICATORS OF COMPROMISE," which is incorporated by reference herein.

Additionally or alternatively, EDR solutions may employ various strategies for endpoint protection, which is also known as "blocking." As an example, a blocking strategy may involve implementing complex detection/protection logic within kernel mode. Another blocking strategy may involve synchronously sending a message from kernel mode to a user mode component (e.g., via a filter communication port) to perform the complex evaluation. Yet another blocking strategy may entail a user mode component terminating processes that match certain protection rules soon after a respective process starts. Another blocking strategy may involve API (application programming interface) hooking in user mode. API hooking refers to a technique by which API calls (e.g., a system call from an application to request a service provided by an operating system) are intercepted and their behaviors altered.

These blocking strategies carry different kinds and degrees of risk. For example, on the one hand, implementing complex detection/protection logic within kernel mode might be fast, but this blocking strategy adds an undesirable amount of complexity to kernel mode and, therefore, adds to the system load and difficulty in running the operating system. It can also affect the stability of the operating system. A bug in a user mode application can bring down the application; however, a bug in kernel mode can bring down the entire operating system. On the other hand, performing complex operations in user mode and not in kernel mode may seem less risky, but this block strategy can slow down the entire operating system as kernel mode needs to wait for the user mode component to respond to the message. Further, even today, most kernel development is done in the C programming language, which is a very low level language that lacks many of the safeties put in place by higher level languages such as Java. As those skilled in the art can appreciate, it is much more difficult to write safe, secure, error free code in C than it is in Java. Another fact is that unit testing (and by extension Test Driven Development) is not typically performed on kernel mode components. Unit testing is a software development practice that is used to increase code quality and eliminate bugs through test automation. For these reasons, kernel mode code is far more difficult to write than user mode code, tends to be done in a far less safe language, is not validated through unit tests, and it can have the greatest consequence if a bug or error occurs (i.e., system crash, leaking sensitive data, etc.).

In view of the drawbacks of known blocking strategies, there is room for innovations and improvements in providing endpoint protection in kernel mode.

SUMMARY OF THE DISCLOSURE

This disclosure provides an EDR solution that implements a new blocking strategy for endpoint protection. The new blocking strategy disclosed herein has most of the advantages of the known blocking strategies without their disadvantages.

In embodiments disclosed herein, the new blocking strategy entails performing just-in-time (JIT) compilation to compile an arbitrary number of complex protection rules. As a non-limiting example, a user may specify an arbitrary number of complex protection rules through a user interface of an endpoint security system. A JIT compiler implementing the new blocking strategy disclosed herein is operable to receive these protection rules and compile them into a single expression tree in user mode. The single expression tree is then compiled into machine code. The machine code is dynamically loaded in kernel mode and an assembler performs assembling and security checks. In some embodiments, to streamline the evaluation process in kernel mode, string operators that leverage regular expressions such as "like" and "not like" are not supported.

In this way, an endpoint security system implementing the solution disclosed herein is operable to process user-specified protection rules with a portion of JIT compilation of the protection rules in user mode and the rest, particularly the evaluation of the protection rules, in kernel mode. Because the protections are actually implemented in kernel mode, they cannot be circumvented from user mode. Further, because protection logic is evaluated within kernel mode, this blocking strategy does not slow down the entire operation system or the applications running in user mode.

As alluded to above, there are reasons and concerns against putting complex code in kernel mode. To address these concerns, the solution disclosed herein provides the following features: (1) Rule compilation (to byte code) is done in user mode. (2) Byte code is checked and validated in kernel mode and (3) compiled further into machine code that is then (4) executed within kernel mode.

Feature (1) is complex, but that is done in user mode. Features (2), (3), and (4) are implemented in kernel mode, and are more complex than the kernel to user message strategy. However, this complexity is managed by keeping the byte code very simple and highly specialized for filtering only. Additionally, features (2), (3), and (4) are thoroughly covered by unit tests and even built using TDD (Test Driven Development). As mentioned earlier, pure unit testing of kernel mode drivers is extremely rare. This is due to the lack of kernel mode unit testing frameworks. While there are test harnesses that automate loading/unloading drivers and performing tests, these are integration tests and not unit tests. One reason why there are no kernel mode unit testing frameworks is that kernel mode code is not allowed to use standard C/C++ libraries. Kernel mode code has special constraints (e.g., 32 times less thread stack space) that make using standard libraries infeasible. Yet another barrier is that there are no user mode implementations of kernel APIs. By design, such kernel APIs cannot be loaded or run in user mode.

Some embodiments disclosed herein provide a special test framework, referred to as a mocking framework, that can make true unit testing and even TDD possible for writing kernel mode code. The mocking framework contains mock implementations for unit testing kernel mode code (e.g., a kernel mode driver) and implements all kernel mode APIs used by the kernel mode code. These mock implementations can trivially simulate various error conditions (e.g., memory allocation failure, etc.). In this way, kernel mode code written using the mocking framework is of extremely high quality, and can achieve 100% branch test coverage. Accordingly, this new blocking strategy allows performing protections on an endpoint in a safe, fast, and efficient way, further enhancing the performance of the endpoint security system.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

As alluded to above, systems in the endpoint security space may leverage various blocking strategies to protect endpoints of a computer network such as one that is owned by an enterprise. Some blocking strategies are implemented in user mode and some in kernel mode. Before discussing these blocking strategies, a brief introduction to modern operating systems might be helpful.

There are many types of operating systems. For instance, there can be operating systems for mainframe computers, server computers, personal computers, etc. Each type of operating system is designed to meet certain goals. As a non-limiting example, FIG. 1 generally depicts the architecture of an operating system running on an endpoint 100. The operating system hides complexity of a hardware layer 130 of endpoint 100 from a user layer 101. To manage the hardware resources, the operating system needs to prevent applications 112 from accessing hardware 130 directly. In this example, the endpoint's processor (e.g., a central processing unit (CPU)) provides two modes of operation—user mode 110 and kernel mode 120—which enforce this separation.

Figure 1:
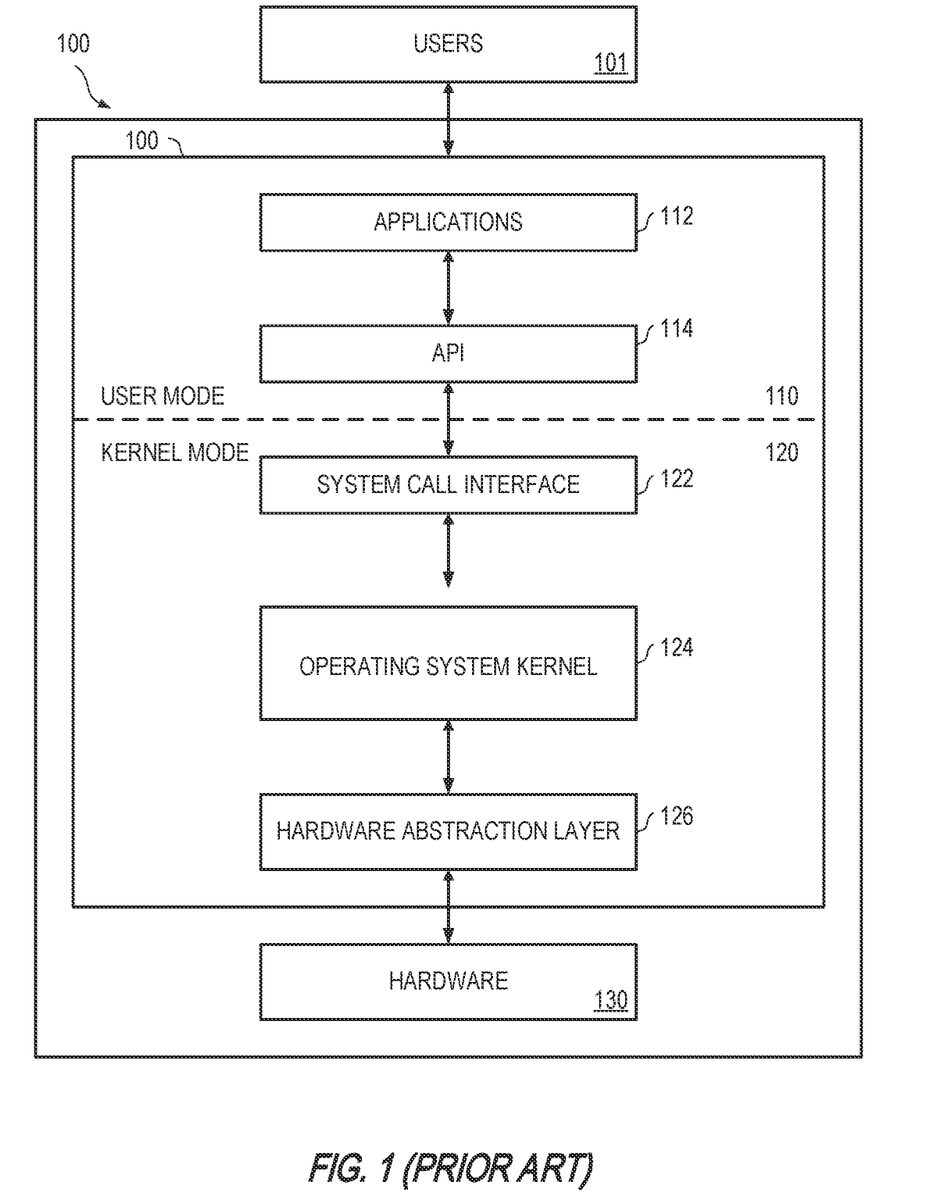
FIG. 1 is an architectural diagram that shows an example of an operating system having a user mode and a kernel mode.

The operating system runs in kernel mode 120, also known as supervisor mode or privileged mode. In kernel mode 120, the operating system has full access to all of the hardware resources at hardware layer 130 and can control switching between the two CPU modes. Interrupts are also received in kernel mode 120. The rest of the software runs in user mode 110. In user mode 110, direct access to the hardware is prohibited, as well as any arbitrary switching to kernel mode 120. Any attempts to violate these restrictions are reported to kernel mode software, i.e., the operating system itself. Applications 112 running in user mode 110 are given an address space in memory. This address space is referred to as user space. The user space contains enough memory for applications 112 to do their jobs. Various types of applications 112 can run in user mode. Non-limiting examples can include compilers, assemblers, text editors, database systems, etc. The operating system provides a set of services to applications 112 through API 114. Depending upon operating system designs, API 114 can vary from implementation to implementation.

In this example, the operating system provides the concept of a process. A process, in this case, refers to a program during execution. The program includes a set of computer instructions and data that resides on a non-transitory computer-readable medium. During execution, the program is loaded into a computer's main memory (e.g., in the user space), utilizes CPU registers to perform operations (e.g., add, subtract, etc.), and has the ability to invoke system calls through a system call interface 122.

As alluded to above, operating system structures can vary from implementation to implementation. As a non-limiting example, an operating system design may entail writing a set of routines at build-time, compiling each routine, and linking all the routines to create a single program referred to as an operating system kernel. At start up of the operating system, operating system software 124 (e.g., an operating system kernel) is loaded into the computer's memory and runs in kernel mode 120. Operating system software 124 has complete control of hardware resources in hardware layer 130 through a hardware abstraction layer 126 and, while the computer is running, is always in the computer's memory. Operating system software 124 performs tasks such as running processes, handling interrupts, and managing hardware devices in a protected space in the computer's memory referred to as kernel space.

Figure 2A:
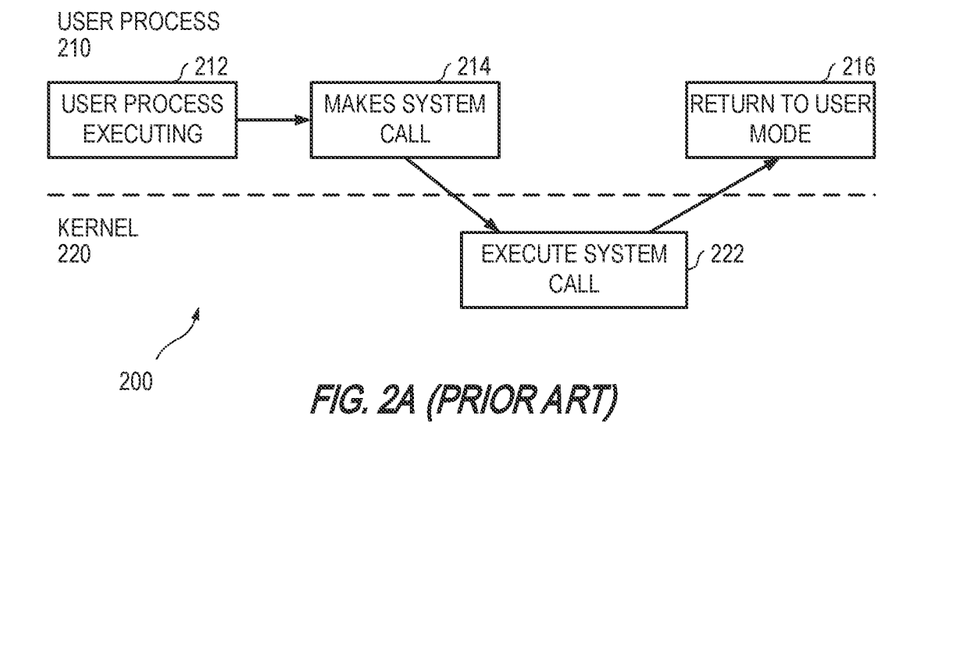
FIG. 2A is a flow diagram that illustrates a dual-mode operating system operation.

FIG. 2A is a flow diagram that illustrates how an operating system runs a user process 200 in two modes. In this case, user process 200 is executing a program (e.g., a text editor) in user mode 210 (212) and makes a system call to request a service provided by the operating system (214). At this time, the operating system transitions from user mode 210 to kernel mode 220 and performs a task (e.g., execute the system call) to fulfill the request (222). The operating system then transitions from kernel mode 220 back to user mode 210 (216).

As discussed above, in kernel mode, an operating system has access to system data and has complete control of hardware resources. On the contrary, applications in user mode have limited access to system data and hardware resources. Once loaded, the central module (i.e., the kernel) of the operating system stays in memory so that the operating system can manage various aspects of tasks and processes such as user process 200 shown in FIG. 2A. If a threat actor is able to gain access to the kernel, they can poke around critical elements of the operating system and perform actions that otherwise would have been prohibited in user mode. For example, suppose the program that user process 200 is executing contains kernel-mode malware. With no block strategy implemented, a threat actor is able to gain access to the kernel through the system call and, consequently, gain access to the computer's resources. This type of malware can inject malicious code into the kernel and can be almost impossible to detect or remove by today's antivirus solutions.

To this end, several blocking strategies have been proposed to block or otherwise prevent malicious attempts to gain access to the kernel. In addition to preventing an attacker to execute code in kernel mode, blocking can also prevent common attacker behaviors, stopping an attacker in their tracks. Some more examples can include preventing credential dumping, preventing shell code from being able to execute, preventing writing malicious files to disk, and so on.

Figure 2B:
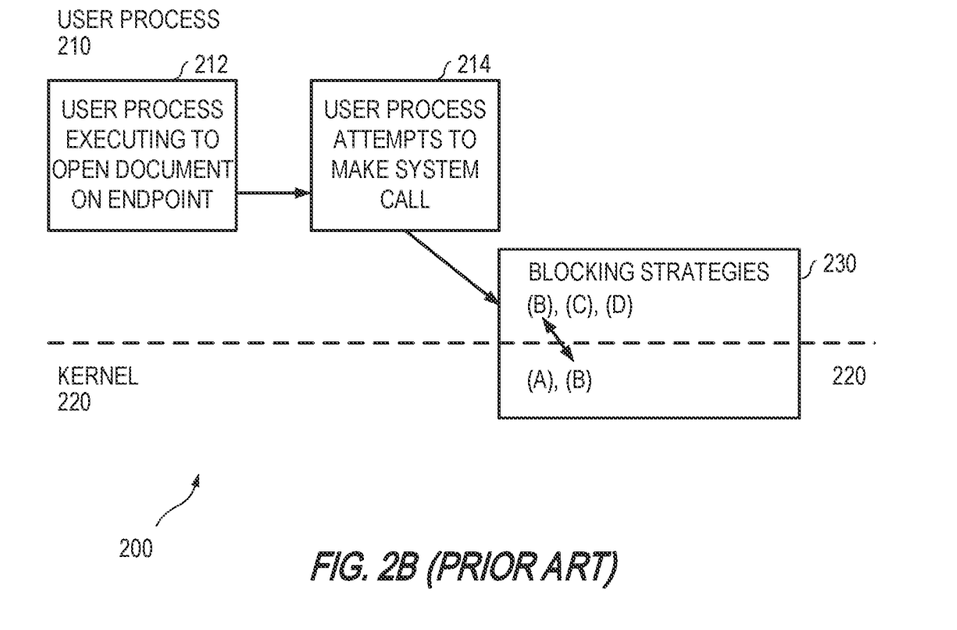
FIG. 2B is a flow diagram that illustrates where known blocking strategies may be implemented in user mode and/or kernel mode to prevent attempts to exploit vulnerabilities of an endpoint.

FIG. 2B is a flow diagram that illustrates where known blocking strategies 230, referred to as Blocking Strategies (A), (B), (C), and (D), may be implemented.

Blocking Strategy (A)

This blocking strategy implements complex detection/protection logic within kernel mode. This blocking strategy tends to be pretty fast, but has the down side of adding a lot of complexity to kernel mode. If the complex detection/protection logic is hardcoded, this blocking strategy would be safer. However, it would have the disadvantages of being hardcoded. A variant of this blocking strategy is to have the complex detection/protection logic hardcoded, but with the ability to turn the protections on/off dynamically. However, because hardcoding is still required, this variant blocking strategy remains quite inflexible. Another variant of this blocking strategy is to support dynamic protection rules in a rather limited way. For example, each protection rule must contain a parent process full path, and a list of either allowed child processes, or denied child processes. With this approach, the expressiveness/power of the protection rules is much reduced. Also, dynamic evaluation of protection rules in kernel mode introduces both complexity (risk) and can slow the whole operating system down, making this variant blocking strategy rather undesirable.

Blocking Strategy (B)

This blocking strategy is less risky than Blocking Strategy (A), as complex operations are not being performed in kernel mode. It also allows for highly expressive/powerful protection rules. However, it has a major drawback. Each process start, dynamic link library (DLL) load, file open, registry write, etc. has to be all synchronously authorized by a user mode service. This means a huge amount of user mode to kernel mode transitions. With a large number of protection rules, this blocking strategy can slow the entire operating system down.

Blocking Strategy (C)

This blocking strategy leverages behavioral pattern matching to terminate unknown malware shortly after execution and allows for the most expressive/power of protection rules without slowing the operating system down. However, it has a major drawback—the malicious process, DLL load, etc. is still allowed to run for a little bit of time. Although it is promptly killed, some damage may already be done in that time. In some cases, it is possible that the malicious process may have run long enough to evade or disable defenses. To some in the industry, this approach is not truly blocking. Rather, it provides fast automatic remediation. Another disadvantage of this approach is that the protections are not implemented in kernel mode. This means that the protections can be circumvented from user mode.

Blocking Strategy (D)

This blocking strategy leverages user mode API hooking to perform "in-process blocking." There are several well-known methods to bypass user mode via API hooking (e.g., invoking system calls directly, unhooking, leveraging debugger API, etc.). These bypasses are possible because, similar to Blocking Strategy (C), the protections are implemented in user mode and not in kernel mode. API hooking can also slow down execution of every running application, by having to authorize each operation. This slowing down is similar, but not as slow, as Blocking Strategy (B).

Blocking Strategy (E)

Figure 3:
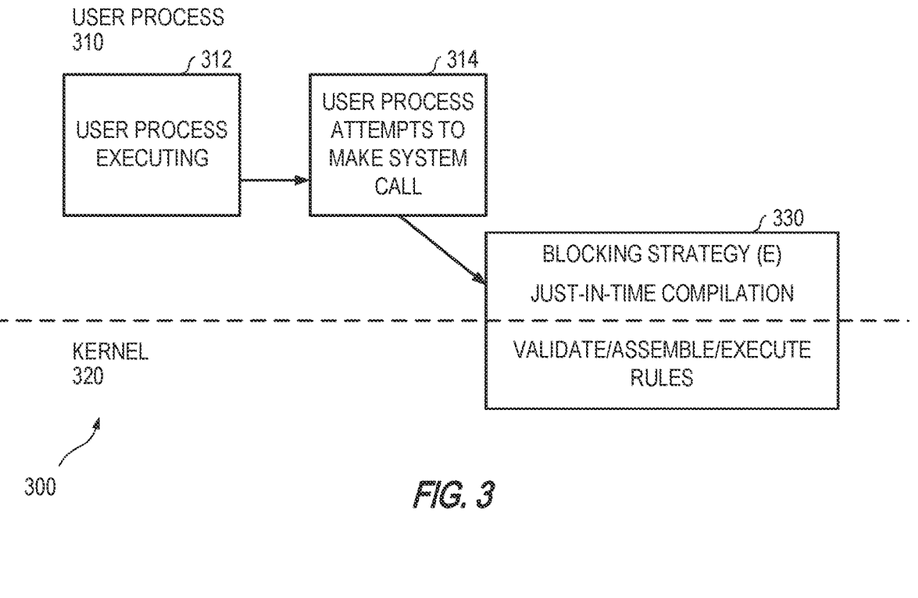
FIG. 3 is a flow diagram that illustrates an example of a new blocking strategy in operation according to some embodiments disclosed herein.

FIG. 3 is a flow diagram that illustrates an example of a new blocking strategy 330, Blocking Strategy (E), in operation according to some embodiments disclosed herein. Features of blocking strategy 330 includes the following features: (1) Rule compilation (to byte code) is done in user mode. (2) Byte code is checked and validated in kernel mode and (3) compiled further into machine code that is then (4) executed within kernel mode. Evaluation of the machine code in the proper places in kernel mode implements the blocking strategy.

In this example, user process 300 is executing a program (e.g., a text editor) in user mode 310 (312) and attempts to make a system call to request a service provided by the operating system (314). At this time, the request is intercepted before the operating system transitions from user mode 310 to kernel mode 320 (330).

Independent of user process 300, an administrator or authorized user of an endpoint security system may specify an arbitrary number of complex protection rules. In some embodiments, users can write their own custom protection rules through a user interface. For example, the user interface shown in FIGS. 2A, 2B, 3A, 3B, 4A, 4B, 4C, 5A, 5B, 5C, 6A, 6B, and 6C of U.S. Patent Application Publication No. US 2022/0094703 A1, which is incorporated by reference herein, can be extended to add creation of real-time protection filters of a new filter type. Using the graphical filter builder user interface shown in U.S. Patent Application Publication No. US 2022/0094703 A1, the system creates a new filter (which implements a rule) in a domain specific language (DSL). Through such a user interface, protection rules can be written without any kind of coding/programming experience (especially, kernel mode programming experience). In some embodiments, a protection rule can be written in the DSL directly.

With Blocking Strategy (E), these protection rules are compiled in user mode 310 into a single expression tree in intermediate language (IL) byte code. As discussed below, the IL byte code is validated and assembled into machine code and executed in kernel mode. With Blocking Strategy (E), a module referred to as a "protection driver" would not execute arbitrary code, but would instead receive protection rule IL byte code.

Figure 4:
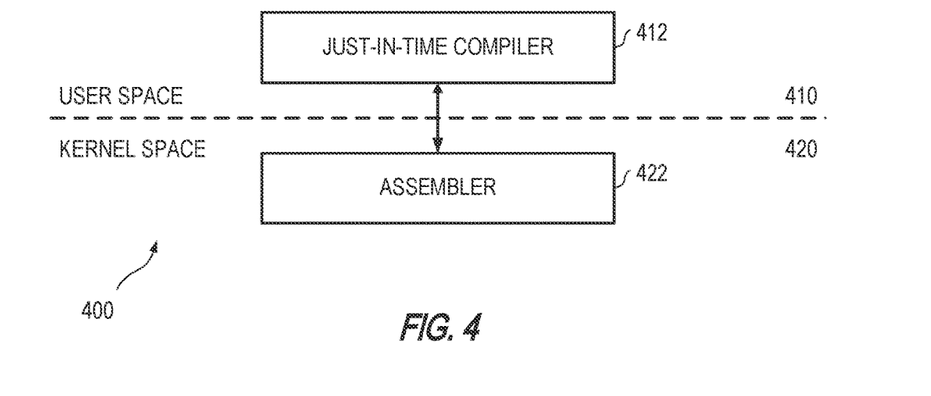
FIG. 4 depicts an example of a JIT compiler operating in the user space and an assembler operating in kernel space according to some embodiments disclosed herein.

Referring to FIG. 4, in some embodiments, rule compilation is performed by a JIT compiler 412 in user space 410. The rule compilation step is the complex part of Blocking Strategy (E). The other part is assembling, which is far less complex than compilation from an algorithmic perspective. Referring to FIG. 4, the assembling step is performed by an assembler 422 in kernel space 420.

In this disclosure, protection rule IL would not be general purpose. Rather, it would be highly restricted to filtering use cases such as those described in U.S. Patent Application Publication No. US 2022/0094703 A1.

In some embodiments, the kernel mode code is dynamically loaded in kernel mode and dynamic function(s) are invoked from within the kernel callbacks. For efficiency and security, in some embodiments, string operators that leverage regular expressions (e.g., like, not like, matches, not matches) would not be supported. In these embodiments, Blocking Strategy (E) may not be as powerful as Blocking Strategy (B) due to the limited string operators. In some embodiments, certain string operators that leverage regular expressions (e.g., like, not like) may be allowed.

In some embodiments, Blocking Strategy (E) may only allow forward conditional jumps and memory can only be read and not written. Further, memory accesses are limited to only input variables and constants.

In some embodiments, assembler 422, which operates in in kernel mode 420, is operable to validate the protection rules (in IL byte code), performing several security checks. Examples of security checks can include, but are not limited to, ensuring conditional jumps are within the bounds of the specified IL byte code, ensuring input/constant reads are within the bounds specified, enforcing restrictions on code size, and disallowing certain operators such as like, not like, matches, not matches, etc.

In some embodiments, metadata needed by the JIT compiler is acquired from kernel mode (e.g., using the ZwQueryInformationProcess function). In most cases, the process full image path is needed. In some cases, the parent process image path is needed. This information may need to be cached. If so, the cache would need to be cleaned up with the process exiting the callback. In some embodiments, any paths thus retrieved will be kernel mode paths (e.g., \Device\Harddisk1\foo.exe instead of C:\foo.exe). Protection rules will take this information (kernel mode paths) into account. Alternatively, the protection rules are translated from user mode paths to kernel mode paths. Because the kind of metadata that can be safely retrieved from kernel mode is limited, the expressive power of protection rules might be somewhat restricted.

Figure 5:
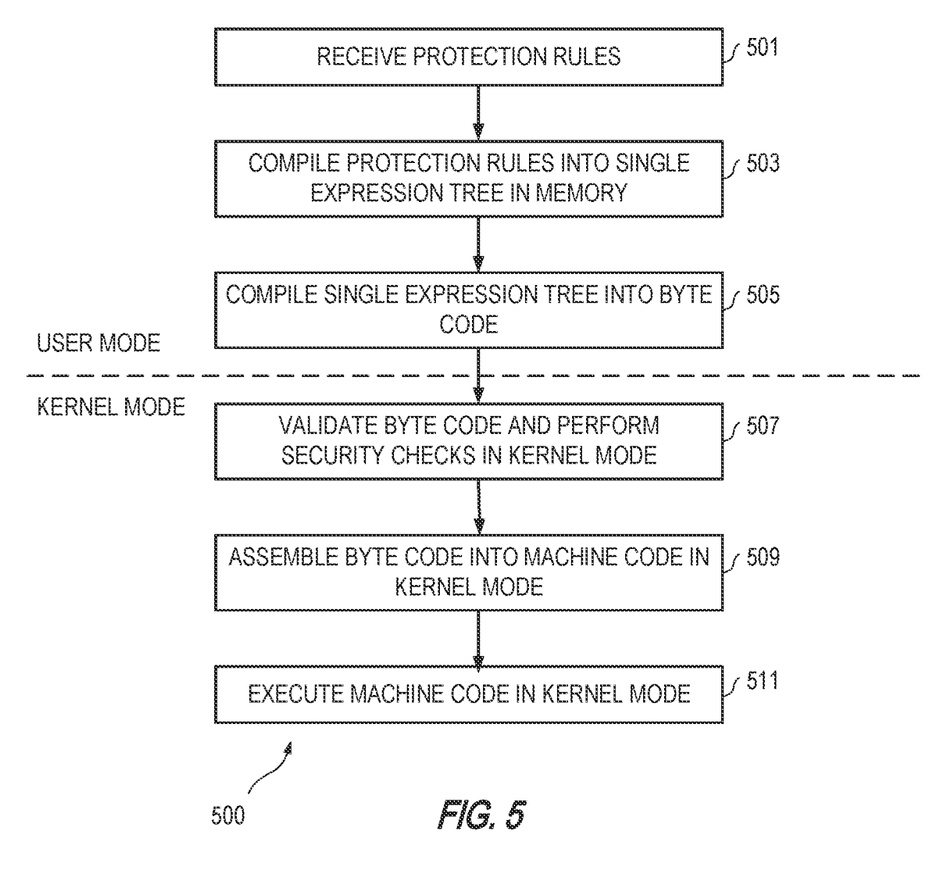
FIG. 5 is a flow chart that illustrates an example of a process for endpoint protection in kernel mode according to some embodiments disclosed herein.

FIG. 5 is a flow chart that illustrates and example of a process 500 for endpoint protection in kernel mode according to some embodiments disclosed herein. As a non-limiting example, a user may specify an arbitrary number of complex protection rules through a user interface of an endpoint security system. A JIT compiler implementing Blocking Strategy (E) is operable to receive these protection rules (501). In user mode, the JIT compiler compiles the protection rules into a single expression tree (503). The single expression tree is then compiled into IL byte code (505). The IL byte code is dynamically loaded in kernel mode. In kernel mode, the IL byte code is validated and several security checks are performed (507). These security checks may involve invoking dynamic function(s) from within kernel callbacks. In kernel mode, the assembler then assembles the IL byte code into machine code (509). The machine code is then executed in kernel mode (511).

In some embodiments, the JIT compiler can be implemented as part of an in-memory evaluator. As a non-limiting example, Table 1 below shows the components of an in-memory evaluator and their corresponding responsibilities.

TABLE 1

| Component | Responsibility | Input | Output |
|---|---|---|---|
| Memory Evaluator | Determine whether a given expression matches an object of interest. | expr, object | true/ false |
| Native Filter | Match an expression on an input object, leveraging native compilation. | expr, object | true/ false |
| Optimizer | Transform input expression into an optimized one. Use laws of Boolean algebra to simplify expression and/or rearrange it based on estimated operator cost. | expr | expr |
| Compiler | Transform optimized expression into byte code-a.k.a. Intermediate Language (IL). | expr | byte code |
| Assembler | Transform byte code into native (machine) code that can execute on the current platform. | byte code | native code |
| Loader | Dynamically load native code into memory and return the virtual address of where the dynamic code is loaded. | native code | virtual address |
| Runner | Given an input object, populate a parameter array and call function at virtual address. | virtual address, object | true/ false |
| Interpreted Filter | Match an expression on an input object using an interpreter | expr, object | true/ false |
| Interpreter | Given an input object, populate a symbol table and recursively reduce expression until the result is a Boolean. Internally, the interpreter is composed of a set of forms-each is responsible for reducing a single operator (e.g. StartsWith). | expr, object | true/ false |

Some embodiments of a system disclosed herein implement a domain-specific language (DSL). DSL is a computer language specialized to a particular application domain. A protection rule can be written in DSL and expressed in an expression tree, DSL allows the use of an interpreter to interpret protection rules represented as expression trees. This interpreter can be embedded in a host application such as a regular expression engine.

With JIT compilation of protection rules in user mode and evaluation of same in kernel mode, Blocking Strategy (E) allows for highly expressive/powerful protection rules similar to Blocking Strategy (B). However, unlike Blocking Strategy (B), Blocking Strategy (E) would not slow down the entire operating system because all protection logic is evaluated within kernel mode. Likewise, unlike Blocking Strategy (D), Blocking Strategy (E) would not slow down applications. Further, Blocking Strategy (E) would be safer than all variants of Blocking Strategy (A) because the machine code is very simple—some fetches from memory into some registers, perform some comparisons, and some fixed jumps. Because the protections are actually implemented in kernel mode, they cannot be circumvented from user mode like Blocking Strategy (C).

As those skilled in the art can appreciate, writing code in a higher level, interpreted language (such as Java) is a lot safer than writing in a lower level language such as C. Today, the vast majority of kernel mode code is written in C. Accordingly, any kernel based blocking strategies implemented today are implemented in C. By implementing protection rules in DSL, and providing a JIT compiler/assembler, the solution disclosed herein effectively allows writing protection logic in a higher level language (the DSL). This makes Blocking Strategy (E) safer to write protection rules than many prior blocking strategies (e.g., safer than Blocking Strategy B) as well as faster (e.g., faster than Blocking Strategy B). Further, high quality kernel mode code can be achieved if the entire JIT compiler/assembler were written through TDD.

TDD is a software development methodology in which code for a program is built from the ground up with tests. Unit testing is about breaking the code into very small pieces and testing those pieces in isolation, one unit, component, or function at a time. In some cases, a test could even be written before the code. Unit testing is a way to ensure high quality code in which every single function in the code is tested and proven to work. Unit testing can also be very fast. For instance, compared with an integration test, which can take hours (e.g., five hours or more) to run, a unit test may take less than a millisecond. This makes it possible to continuously run a unit test on the code under development every few minutes (e.g., every five minutes) to ensure everything thus built so far works.

Generally, however, unit testing is performed in user mode and not in kernel mode. This is because no known test frameworks will work in kernel mode. As discussed below, Blocking Strategy (E) leverages a novel mocking framework that can make true unit testing and even TDD possible for writing kernel mode code. In some embodiments, the mocking framework contains mock implementations of every single kernel mode API used by the kernel mode code under development (e.g., a kernel mode driver). To test the mock implementations, unit tests are written against the kernel mode code. These unit tests, which run in user mode, can be written using a standard unit testing framework. The mock implementations simulate kernel mode failure/error conditions that are very hard, sometimes impossible, to make happen in the real world, for example, simulate out of memory, simulate out of disk space, and so on.

Figure 6:
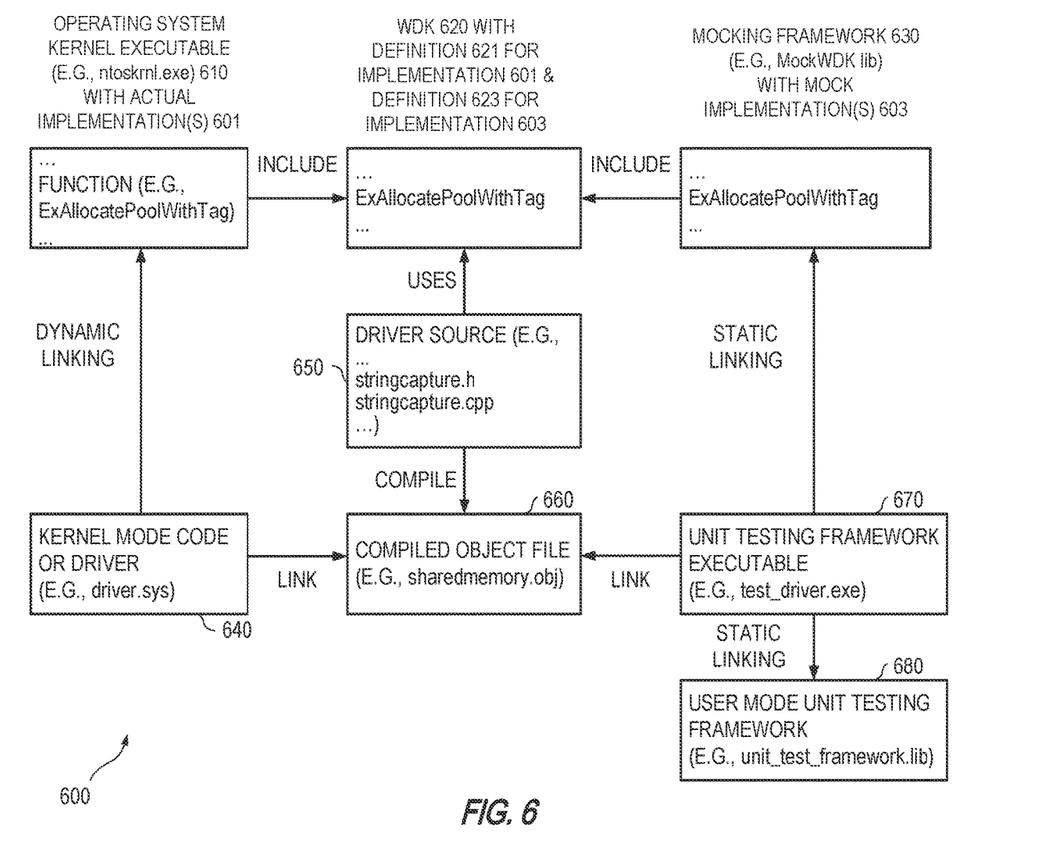
FIG. 6 is a diagram that illustrates how unit testing of kernel mode code can be achieved with a mocking framework according to some embodiments disclosed herein.

As a non-limiting example, FIG. 6 shows an example of a method 600 for unit testing with a mocking framework. As those skilled in the art can appreciate, when the kernel receives control, an operating system kernel executable 610 (e.g., "ntoskrnl.exe"), also known as kernel image, provides the kernel and executable layers of the kernel space. Generally, the operating system kernel executable 610 is responsible for various system services, including providing an implementation of system calls.

In the example of FIG. 6, a kernel mode function 601 (e.g., "ExAllocatePoolWithTag") is called by a kernel mode driver 640 (e.g., "driver.sys"). That is, the kernel mode driver 640 (e.g., "driver.sys") is dynamically linked to the kernel mode function 601 (e.g., "ExAllocatePoolWithTag") as defined in source code 650. Source code 650 uses definitions contained in a WINDOWS Driver Kit (WDK) 620 which, in this case, includes both a definition 621 for an actual implementation 601 of the function "ExAllocatePoolWithTag" contained in the operating system kernel executable 610 and a definition 623 for a mock implementation 603 of the function "ExAllocatePoolWithTag" contained in a mocking framework 630 ("Mock WINDOWS Driver Kit" or "MockWDK"). The mocking framework 630 implements all kernel mode APIs used by the kernel mode driver 640, and can trivially simulate various error conditions (e.g., memory allocation failure, etc.). In this way, kernel mode code written using the mocking framework is of extremely high quality, and can achieve 100% branch test coverage.

As illustrated in FIG. 6, mocking framework 630 can contain mock implementations for unit testing kernel mode drivers or any kernel mode code that gets loaded to the kernel (e.g., a driver loaded to the kernel by a third party). Below is a non-limiting example of a mock implementation that simulates an error condition in kernel mode:

```
// MockWDK implementation of ExAllocatePoolWithTag
// * Can simulate a memory allocation failure
// * Can be used to write unit tests that verify API is called
the proper number of times
// * Validates input parameters
// * Validates proper IRQL
// * (omitted for brevity) detects kernel mode memory leaks... in
a user mode test framework
// All these things can be validated for real in kernel mode ...
but they would crash the operating system
// Using MockWDK, these things can be tested safely (in user
mode) and quickly (thousands of tests can easily run in a couple
of seconds)
PVOID NTAPI ExAllocatePoolWithTag (POOL_TYPE poolType,
SIZE_T numberOfBytes, ULONG tag)
    MOCKWDK_VERIFY_DISPATCH_LEVEL( );
    ++MockWDK.ExAllocatePoolWithTag.CallCount;
    if (MOCKWDK_VERIFYM(!(MockWDKThread.CurrentIRQL ==
DISPATCH_LEVEL &&
        !IsNonPagedPool(poolType)), "Pool type
not allowed at DISPATCH_LEVEL")) {
        if (MOCKWDK_VERIFY(numberOfBytes > 0)) {
            if (!MockWDK.ExAllocatePoolWithTag.ReturnFailure)
                return malloc(numberOfBytes);
        }
    }
    return NULL;
}
```

In some embodiments, unit tests for testing kernel mode code can be written using a user mode unit testing framework 680. For example, a unit test can specify that the next time when the function "ExAllocatePoolWithTag" is called, the function is to return a particular failure code. Below is a non-limiting example of a unit test.

```
#include "stringcapture.h"
// A test that uses MockWDK to simulate a memory allocation
failure
// The code under test is StringCapture
// StringCapture internally uses ExAllocatePoolWithTag
// This test ensures that StringCapture creation returns the
appropriate error code when an allocation failure occurs
TEST_F(StringCapture, UT_Create_ExAllocatePoolWithTag_Fails) {
    UNICODE_STRING str = RTL_CONSTANT_STRING(L"A");
    MockWDK.ExAllocatePoolWithTag.ReturnFailure = true;
    ASSERT_EQ(STATUS_INSUFFICIENT_RESOURCES,
        StringCaptureCreate(&StringCapture, &str));
}
```

In the example of FIG. 6, a kernel function for memory allocation is called by the kernel mode driver. A unit test is written to test a mock implementation that simulates a memory allocation failure when the kernel function is called via a kernel API used by the kernel mode driver. The mock implementation of the kernel function is loaded in user mode by the mocking framework and called by the unit test through a unit testing framework executable 670.

Because mock implementations are controlled by the mocking framework, it is possible to make a certain mock implementation fail and have it return a certain result (e.g., an error or a failure) for a particular test without risking real world consequences. Here, the unit test is written to test how the kernel mode driver works in a low memory condition when a kernel function tries to allocate memory and the corresponding kernel API in a mock implementation returns a failure response.

The unit testing framework executable 670 (e.g., "test_driver.exe") constantly runs in a testing environment in user mode and calls a compiled object file 660 of the kernel mode driver 640 being tested. However, the real kernel mode driver 640 (e.g., "driver.sys") is not loaded in kernel mode. Instead, the mocking framework 630 calls the individual kernel functions within the driver's source code 650 and provides the mock implementations 603 of the individual kernel functions. That is, instead of actually making the system run out of memory to test how the kernel mode driver would respond when the API call to allocate memory fails, the mock implementation can safely simulate such a kernel mode error condition in user mode. The kernel mode driver is unaware of whether it is running in the mocking framework or in the real world. Such a unit test can run under a millisecond, which is extremely fast. Through mock implementations, the mocking framework disclosed herein can simulate any scenarios that the kernel mode code may run into in the real world, no matter how common or rare a scenario might be. In this way, kernel mode code written using the mocking framework is of extremely high quality, and can achieve 100% branch test coverage.

In some embodiments, the mocking framework is not limited to providing mock implementation of kernel functions and can simulate fairly complicated sub-systems of the WINDOWS kernel, including file system mini-filters. Typically, the file system mini-filters are implemented as an abstraction layer over an input/output (I/O) manager called the filter manager. The filter manager and the file system mini-filters can be quite complex. For example, a mini-filter can register a pre-operation callback and a post-operation callback for each of the major I/O request packets (IRPs). IRPs are kernel mode structures that are used by WINDOWS drivers to communicate with each other and with the operating system. All I/O operations in WINDOWS translate to one or more IRPs. However, it is not always clear what operations on files (e.g., delete) translate to which IRPs (e.g., IRP_SET_INFORMATION with FileDispositionInformation) as there are many ways to accomplish the same thing. For instance, "delete" can be accomplished through DeleteFile( ) or CreateFile( ) with DELETE_ON_cLOSE flag. These generate different sequences of IRPs. Further, the I/O manager, file system driver, cache manager, and virtual memory manager work together to implement file I/O. Depending on how a the was opened, how the file was used, if the file's data is already in the cache, etc., some mini-filters may not see IRPs until much later, sometimes even 30 minutes later, after the application closes. Moreover, the same mini-filter can be "attached" to a given volume (i.e., an "instance") multiple times at different "altitudes," while other mini-filters (e.g., legacy file system filters) can change the IRP between when the pre-operation callback of the mini-filter is invoked and when the post-operation callback is invoked. These and other complexities (e.g., files can be opened and shared between different processes) makes simulating even simple I/O operations a practically impossible task.

To this end, in some embodiments, the mocking framework may include a mock filter manager component (e.g., "MockFltMgr"). The mock filter manager can reduce the amount of boilerplate code in file system mini-filters and streamline the testing of file system mini-filters (e.g., driver file callback). Below is an example of how to use the mock filter manager to simulate reading the first 100 bytes of a file, write 3 bytes starting at offset 5, rename, and then delete the file.

```
auto volume = MockFltMgr.AddVolume("C:");
auto file = volume->CreateFile("folder\\foo.txt", GENERIC_ALL, 0,
OPEN_EXISTING, 0);
byte readBuffer[100];
file->Read(0, readBuffer, sizeof(readBuffer));
byte writeBuffer[3] = {0x41, 0x42, 0x43};
file->Write(5, writeBuffer, sizeof(writeBuffer));
file->Rename ("folder\\bar.txt");
file->Delete( );
file->CloseHandle( );
file->DestroyFileObject( );
```

This will create all the appropriate IRPs and dispatch them to registered filters. The mock filter manager supports multiple filters, instances, and can even simulate two different processes sharing the same file.

Testing WINDOWS kernel file system mini-filters can be fairly difficult to implement correctly. With the mock filter manager disclosed herein, testing file system mini-filters can be vastly easier, safer, faster, etc. In this way, the mocking framework is not limited to providing mock implementation of kernel functions and can also simulate fairly complicated sub-systems of the WINDOWS kernel.

Figure 7:
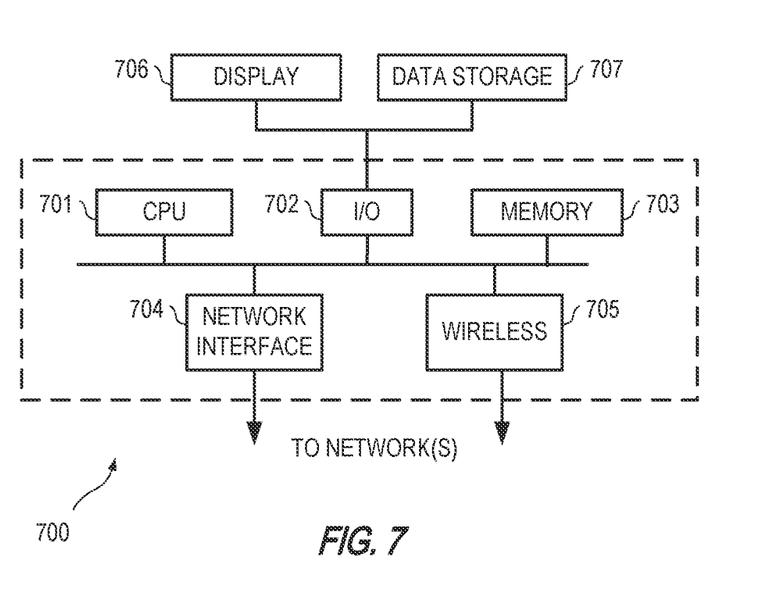
FIG. 7 depicts a diagrammatic representation of a data processing system for implementing an embodiment disclosed herein.

FIG. 7 depicts a diagrammatic representation of a data processing system for implementing an embodiment disclosed herein. As shown in FIG. 7, data processing system 700 may include one or more CPUs or processors 701 coupled to one or more user input/output (I/O) devices 702 and memory devices 703. Examples of I/O devices 602 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 706, information device 707 and various peripheral devices (not shown), such as printers, plotters, speakers, etc. through I/O devices 702. Data processing system 700 may also be coupled to other computers or devices through network interface 704, wireless transceiver 705, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, particularly DSL. Other software/hardware/network architectures may be used, including programming languages such as C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
    receiving a protection rule through a user interface, the receiving performed by a module running on an endpoint of a computer network, the endpoint having an operating system which operates in a user mode and a kernel mode, the module having a just-in-time compiler and an assembler, the protection rule implementing a blocking strategy to provide endpoint protection;
    compiling, by the just-in-time compiler in the user mode, the protection rule into an expression tree;
    compiling, by the just-in-time compiler in the user mode, the expression tree into byte code;
    dynamically loading, by the assembler, the byte code in the kernel mode of the operating system;
    validating, by the assembler, the byte code in the kernel mode;
    performing, in the kernel mode, a plurality of security checks on the byte code; and
    assembling, by the assembler, the byte code into machine code for execution in the kernel mode so as to implement the blocking strategy in the kernel mode.

2. The method according to claim 1, further comprising: acquiring a kernel mode path for the protection rule from the kernel mode.

3. The method according to claim 1, further comprising: translating the protection rule from a user mode path to a kernel mode path.

4. The method according to claim 1, wherein the protection rule is one of a plurality of protection rules received through the user interface.

5. The method according to claim 4, wherein the just-in-time compiler compiles the plurality of protection rules into a single expression tree in the user mode.

6. The method according to claim 1, wherein the plurality of security checks comprises at least one of disallowing a set of string operators, validating jump targets, or bounds checking of memory accesses.

7. A system, comprising:
a processor which provides a user mode and a kernel mode for an operating system;
a non-transitory computer-readable medium; and
instructions stored on the non-transitory computer-readable medium and translatable by the processor for implementing a module having a just-in-time compiler and an assembler, the instructions when translated by the processor perform:
receiving a protection rule through a user interface, the receiving performed by the module in the user mode of the operating system, the protection rule implementing a blocking strategy to provide endpoint protection;
compiling, by the just-in-time compiler in the user mode, the protection rule into an expression tree;
compiling, by the just-in-time compiler in the user mode, the expression tree into byte code;
dynamically loading, by the assembler, the byte code in the kernel mode of the operating system;
validating, by the assembler, the byte code in the kernel mode;
performing, in the kernel mode, a plurality of security checks on the byte code; and
assembling, by the assembler, the byte code into machine code for execution in the kernel mode so as to implement the blocking strategy in the kernel mode.

8. The system of claim 7, wherein the instructions when translated by the processor further perform:
acquiring a kernel mode path for the protection rule from the kernel mode.

9. The system of claim 7, wherein the instructions when translated by the processor further perform:
translating the protection rule from a user mode path to a kernel mode path.

10. The system of claim 7, wherein the protection rule is one of a plurality of protection rules received through the user interface.

11. The system of claim 10, wherein the just-in-time compiler compiles the plurality of protection rules into a single expression tree in the user mode.

12. The system of claim 7, wherein the plurality of security checks comprises at least one of disallowing a set of string operators, validating jump targets, or bounds checking of memory accesses.

13. A computer program product comprising a non-transitory computer-readable medium storing instructions translatable by a processor to implement a module having a just-in-time compiler and an assembler, wherein the processor provides a user mode and a kernel mode for an operating system and wherein the instructions when translated by the processor perform:
receiving a protection rule through a user interface, the receiving performed by the module in the user mode of the operating system, the protection rule implementing a blocking strategy to provide endpoint protection;
compiling, by the just-in-time compiler in the user mode, the protection rule into an expression tree;
compiling, by the just-in-time compiler in user mode, the expression tree into byte code;
dynamically loading, by the assembler, the byte code in the kernel mode of the operating system;
validating, by the assembler, the byte code in the kernel mode;
performing, in the kernel mode, a plurality of security checks on the byte code; and
assembling, by the assembler, the byte code into machine code for execution in the kernel mode so as to implement the blocking strategy in the kernel mode.

14. The computer program product of claim 13, wherein the instructions when translated by the processor further perform:
acquiring a kernel mode path for the protection rule from the kernel mode.

15. The computer program product of claim 13, wherein the instructions when translated by the processor further perform:
translating the protection rule from a user mode path to a kernel mode path.

16. The computer program product of claim 13, wherein the protection rule is one of a plurality of protection rules received through the user interface and wherein the just-in-time compiler compiles the plurality of protection rules into a single expression tree in the user mode.

17. The computer program product of claim 13, wherein the plurality of security checks comprises at least one of disallowing a set of string operators, validating jump targets, or bounds checking of memory accesses.

* * * * *